Dec. 6, 1966  R. A. COX  3,289,332
TRACTOR SCRAPER BLADE
Filed March 30, 1965
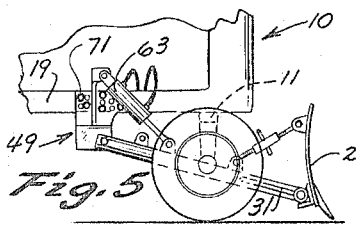
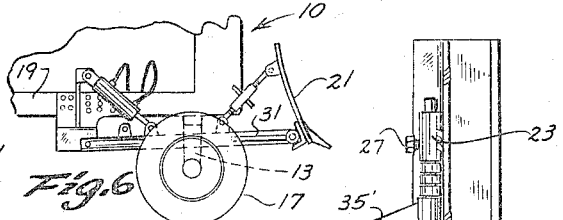
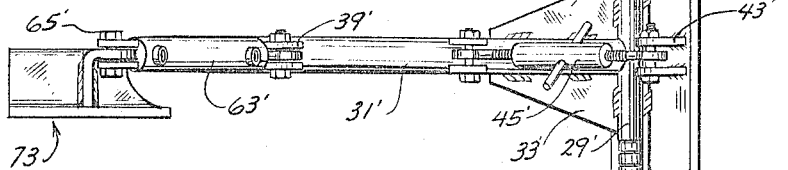
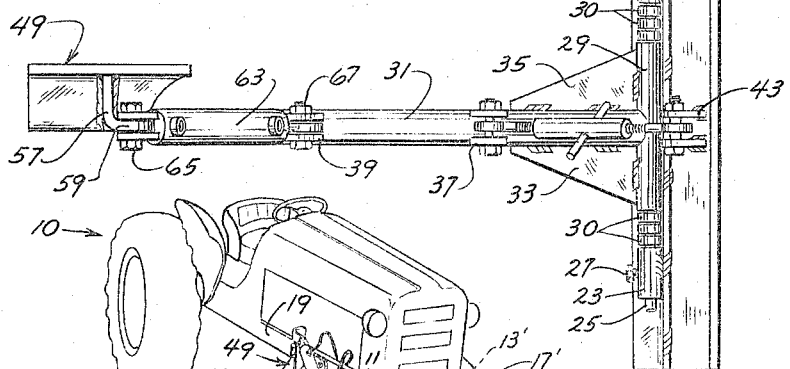
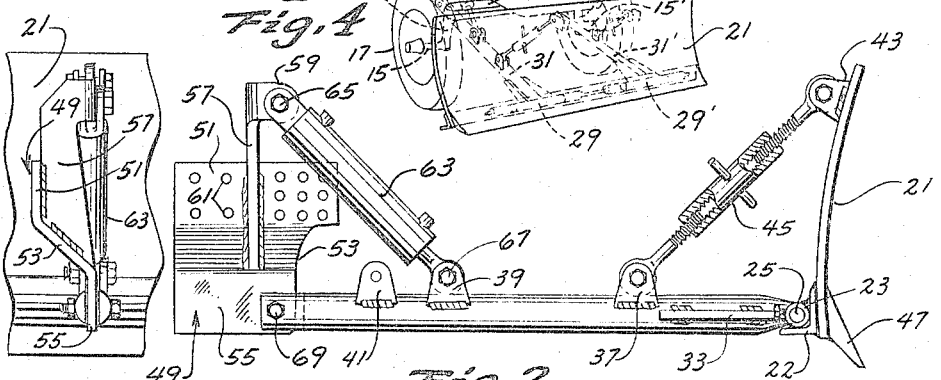
INVENTOR
RANDAL A. COX
BY Dick, Zarley, McKee & Thomte
ATTORNEYS United States Patent Office 3,289,332
Patented Dec. 6, 1966

3,289,332
TRACTOR SCRAPER BLADE
Randal A. Cox, Van Wert, Iowa
Filed Mar. 30, 1965, Ser. No. 443,962
6 Claims. (Cl. 37—144)

This invention relates to a scraper blade and more particularly to a tractor scraper blade.

The attachment of a scraper blade to the front end of a tractor has heretofore presented several problems. Some of these problems are: (1) The existing scraper blades are not adapted to fit a variety of sizes or makes of tractors; (2) The existing scraper blades do not provide the tractors with improved traction for the rear wheels thereof; (3) The existing scraper blades do not permit the weight of the tractor to be effectively utilized to enable the scraper blades to cut into the hard ground; (4) The scraper blades must be removed from the tractor if the tractor is to be used for purposes other than scraping, and (5) The scraper blades are not conveniently attachable and detachable.

Therefore, a principal object of this invention is to provide an improved tractor scraper blade.

A further object of this invention is to provide a tractor scraper blade wherein the traction of the rear wheels is increased when the hydraulic rams lift the loaded scraper blade.

A further object of this invention is to provide a tractor scraper blade which gives the tractor a better center of gravity for the operation thereof.

A further object of this invention is to provide a tractor scraper blade which effectively utilizes the weight of the tractor to enable the scraper to cut into hard ground.

A further object of this invention is to provide a tractor scraper blade which is conveniently attachable and detachable.

A further object of this invention is to provide a tractor scraper blade which can be mounted on a variety of different sizes and makes of tractors.

A further object of this invention is to provide a tractor scraper blade which may be left on the tractor during periods of farm work.

A further object of this invention is to provide a tractor scraper blade wherein the blade may be tilted by means of turnbuckles.

A further object of this invention is to provide a tractor scraper blade which is pivotally secured to the tractor behind and below the front axle.

A further object of this invention is to provide a tractor scraper blade having means thereon to permit precise control over the raising and lowering thereof.

A further object of this invention is to provide a tractor scraper blade which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top view of the device;
FIG. 2 is a side elevational view of the device;
FIG. 3 is a fragmentary end view of the device as viewed from the left in FIG. 2;
FIG. 4 is a perspective view of the device mounted on a tractor with broken lines indicating structure which would not otherwise be visible;
FIG. 5 is a side elevational view of the device mounted on a tractor and being in a lowered position; and
FIG. 6 is a side elevational view of the device mounted on a tractor and being in a raised position.

The numeral 10 generally designates a tractor having a front axle 11, journals 13 and 13' extending downwardly from opposite ends of axle 11, spindles 15 and 15' extending outwardly from journals 13 and 13' respectively and wheels 17 and 17' rotatably mounted on spindles 15 and 15' respectively. The frame of the tractor is generally represented by the reference numeral 19 as seen in FIGS. 4, 5 and 6.

The numeral 21 designates a scraper blade having an elongated angle 22 secured to its lower rearward side by welding or the like as best seen in FIGS. 1 and 2. As best seen in FIG. 1, a plurality of sleeves 23 are welded to angle 22 and are adapted to receive shaft 25 extending therethrough and therebetween. Shaft 25 is maintained in sleeves 23 by any convenient means such as by screws 27 threadably extending through the outermost sleeves 23 and engaging shaft 25 or by pins (not shown) extending through the exposed ends of shaft 25.

An elongated pipe 29 rotatably embraces shaft 25 adjacent one end thereof and has an arm 31 welded thereto which extends rearwardly therefrom. As seen in FIG. 1, a plurality of shims 30 embrace shaft 25 for a purpose which will be explained later. A reinforcing plate 33 is welded to pipe 29 and to one side of arm 31. A second reinforcing plate 35 is also welded to pipe 29 and to the opposite side of arm 31 as best seen in FIG. 1. Arm 31 is provided with brackets 37, 39 and 41 which are welded to the upper surface thereof and extend upwardly therefrom. Each of brackets 37, 39 and 41 are comprised of spaced apart ear members having registering holes formed therein. Bracket 37 is positioned adjacent the forward end of arm 31 while brackets 39 and 41 are positioned adjacent the rearward end of arm 31.

As seen in FIG. 1, a bracket 43 comprised of spaced apart ear members is welded to the upper rearward surface of blade 21. A turnbuckle 45 is pivotally connected at its ends to brackets 37 and 43 respectively and extends therebetween. Blade 21 is also provided with a reversible cutting blade 47 secured to the lower forward edge thereof.

The numeral 49 generally designates an all-purpose bracket having a vertical upper portion 51, an inclined intermediate portion 53 and a vertical lower portion 55. A plate 57 is welded to upper portion 51 and intermediate portion 53 and extends outwardly therefrom and has a tab portion 59 at its upper end which extends forwardly therefrom. As best seen in FIG. 2, upper portion 51 of bracket 49 is provided with a plurality of apertures 61 formed therein.

A double acting hydraulic cylinder 63 is pivotally secured at its base to tab 59 by any convenient means such as by bolt 65 and has its piston rod pivotally secured to either of brackets 39 or 41 by means of bolt 67. Cylinder 63 is conventionally fluidly connected to a hydraulic pump on the tractor to withdraw and extend the piston rod thereof.

The slotted rearward end of arm 31 is pivotally secured to the lower forward portion of lower portion 55 of bracket 49 by any convenient means such as by bolt 69. Bracket 49 is secured to the frame 19 of tractor 10 by means of bolts 71.

Inasmuch as the lifting structure at the other side of the device is identical to that just described, only one side will be described with " ' " indicating identical structure. Bracket 73 is an identical but reversed version of bracket 49 and is bolted to the frame of the tractor at a point opposite to bracket 49.

The normal method of operation is as follows: The assembled device is secured to frame 19 of tractor 10 by means of bolts 71 extending through brackets 49 and 73. The plurality of apertures 61 formed in the brackets permit the brackets to be secured to any number of different sizes or makes of tractors. It can be appreciated that arms 31 and 31' are pivotally connected at their rearward ends to brackets 49 and 73 respectively at a point below and behind front axle 11. It can be appreciated that the placement of the pivotal connection of arms 31 and 31' to brackets 49 and 73 respectively provides a better center of gravity for the tractor and blade. Additionally, when hydraulic cylinders 63 and 63' raise the loaded blade, increased weight is exerted on the rearward end of the tractor so that the rear wheels thereof are provided with increased traction. Further, the front end of the tractor may be raised up by extending hydraulic cylinders 63 and 63' so that the blade will have a greater weight exerted thereon to enable it to cut into hard ground.

The provision of two double acting cylinders to the device provides precise control for raising and lowering the blade 21. It can be appreciated that the blade may be left on the tractor during other farm operations due to its ability to be raised to a position which is out of the way of the tractor such as seen in FIG. 6. It has been found that an eight (8) inch stroke of hydraulic cylinders 63 and 63' will raise blade 21 approximately thirty (30) inches. Preferably, blade 21 should be approximately eight (8) to ten (10) inches in front of the front wheels of the tractor.

It can be appreciated that the device is quickly and easily attachable and detachable due to the fact that only two bolts must be removed from each side of the device to separate it from a tractor, that is, bolts 65, 69, 65' and 69'. The device may be adjusted to fit tractors of different widths by simply positioning shims 30 at the opposite ends of pipes 29 and 29' as needed to increase or decrease the distance between arm members 31'. For example, if it were necessary to decrease the distance between arm members 31 and 31', the required number of shims 30 adjacent the inner ends of pipe 29 would be removed from shaft 25 and placed on shaft 25 adjacent the outer ends of pipes 29 and 29' respectively. The blade 21 may be leveled or tilted by means of turnbuckles 45 and 45'. If it is desired to change the lift of blade 21, it is simply necessary to pivotally secure the piston rods of hydraulic cylinders 63 and 63' to brackets 41 and 41'.

Thus from the foregoing it can be seen that the device accomplishes at least all of its stated objectives.

Some changes may be made in the construction and arrangement of my tractor scraper blade without departing from the real spirit and purpose of my invention, and it is my intention to cover by my claims any modified forms of structure or use of mechanical equivalents which may be reasonably included within their scope.

I claim:
1. In a scraper blade for a tractor,
a blade having rearward and forward sides,
a plurality of horizontally disposed, spaced apart sleeves secured to the rearward side of said blade,
a shaft rotatably received by and extending between said sleeves, first and second pipes rotatably embracing said shaft adjacent opposite ends thereof,
a plurality of shim elements removably embracing said shaft and being selectively positioned thereon whereby said first and second pipes may be selectively spaced from each other by the selective positioning of said shim elements on said shaft with respect to said sleeves and said first and second pipes,
first and second arm members secured to said first and second pipes respectively and extending rearwardly therefrom,
first and second brackets adapted to be secured to frame of a tractor at opposite sides thereof,
said first and second arm members being pivotally connected at their rearward ends to said first and second brackets respectively adjacent the lower ends thereof,
and first and second hydraulic ram means operatively connected to said first and second arm members respectively to raise and lower said first and second arm members and said blade.

2. In a scraper blade for a tractor,
a blade having rearward and forward sides,
a plurality of horizontally disposed, spaced apart sleeves secured to the rearward side of said blade,
a shaft rotatably received by and extending between said sleeves,
first and second pipes rotatably embracing said shaft adjacent opposite ends thereof,
a plurality of shim elements removably embracing said shaft and being selectively positioned thereon whereby said first and second pipes may be selectively spaced from each other by the selective positioning of said shim elements on said shaft with respect to said sleeves and said first and second pipes,
first and second arm members secured to said first and second pipes respectively and extending rearwardly therefrom,
first and second brackets adapted to be secured to the frame of a tractor at opposite sides thereof,
said first and second arm members being pivotally connected at their rearward ends to said first and second brackets respectively adjacent the lower ends thereof,
and first and second hydraulic ram means operatively connected to and extending between the upper ends of said first and second brackets and said first and second arm members respectively adjacent the rearward ends thereof.

3. In a scraper blade for a tractor,
a blade having rearward and forward sides,
a plurality of horizontally disposed, spaced apart sleeves secured to the rearward side of said blade,
a shaft rotatably received by and extending between said sleeves,
first and second pipes rotatably embracing said shaft adjacent opposite ends thereof,
a plurality of shim elements removably embracing said shaft and being selectively positioned thereon whereby said first and second pipes may be selectively spaced from each other by the selective positioning of said shim elements on said shaft with respect to said sleeves and said first and second pipes,
first and second arm members secured to said first and second pipes respectively and extending rearwardly therefrom,
first and second brackets adapted to be secured to the frame of a tractor at opposite sides thereof,
said first and second arm members being pivotally connected at their rearward ends to said first and second brackets respectively adjacent the lower ends thereof,
first and second hydraulic ram means operatively connected to and extending between the upper ends of said first and second brackets and said first and second arm members respectively adjacent the rearward ends thereof,
and a turnbuckle means secured to and extending between at least one of said arm members and said blade for changing the pitch of said blade at times.

4. In a scraper blade for a tractor,
a blade having rearward and forward sides,
a plurality of horizontally disposed, spaced apart sleeves secured to the rearward side of said blade,
a shaft rotatably received by and extending between said sleeves,
first and second pipes rotatably embracing said shaft adjacent opposite ends thereof,
a plurality of shim elements removably embracing said shaft and being selectively positioned thereon whereby said first and second pipes may be selectively spaced from each other by the selective positioning of said shim elements on said shaft with respect to said sleeves and said first and second pipes, first and second arm members secured to said first and second pipes respectively and extending rearwardly therefrom, first and second brackets adapted to be secured to the frame of a tractor at opposite sides thereof, said first and second arm members being pivotally connected at their rearward ends to said first and second brackets respectively adjacent the lower ends thereof, and first and second hydraulic ram means operatively connected to and extending between the upper ends of said first and second brackets and said first and second arm members respectively adjacent the rearward ends thereof, said first and second arm members being pivotally connected to said first and second brackets respectively rearwardly and below the front axle of said tractor.

5. In a scraper blade for a tractor, a blade having rearward and forward sides, a plurality of horizontally disposed, spaced apart sleeves secured to the rearward side of said blade, a shaft rotatably received by and extending between said sleeves, first and second pipes rotatably embracing said shaft adjacent opposite ends thereof, a plurality of shim elements removably embracing said shaft and being selectively positioned thereon whereby said first and second pipes may be selectively spaced from each other by the selective positioning of said shim elements on said shaft with respect to said sleeves and said first and second pipes, first and second arm members secured to said first and second pipes respectively and extending rearwardly therefrom, first and second brackets adapted to be secured to the frame of a tractor at opposite sides thereof, first and second arm members secured to said first and second pipes respectively and extending rearwardly therefrom, first and second brackets adapted to be secured to the frame of a tractor at opposite sides thereof, said first and second arm members being pivotally connected at their rearward ends to said first and second brackets respectively adjacent the lower ends thereof, and first and second hydraulic ram means operatively connected to and extending between the upper ends of said first and second brackets and said first and second arm members respectively adjacent the rearward ends thereof, each of said first and second brackets having a vertical upper portion, an intermediate inclined portion, a vertical lower portion and a plate member secured to said upper and intermediate portions extending outwardly therefrom, each of said brackets adapted to be secured at its upper portion to said tractor frame, said plate member on each of said first and second brackets being pivotally connected to one of said hydraulic rams.

6. In an earth working implement for a tractor, a support member for said implement extending transversely of said tractor, a plurality of horizontally disposed, spaced apart sleeves secured to the support member, a shaft rotatably received by and extending between said sleeves, first and second pipes rotatably embracing said shaft adjacent opposite ends thereof, a plurality of shim elements removably embracing said shaft and being selectively positioned thereon whereby said first and second pipes may be selectively spaced from each other by the selective positioning of said shim elements on said shaft with respect to said sleeves and said first and second pipes, first and second arm members secured to said first and second pipes respectively and extending rearwardly therefrom, first and second brackets adapted to be secured to the frame of a tractor at opposite sides thereof, said first and second arm members being pivotally connected at their rearward ends to said first and second brackets, and first and second hydraulic ram means operatively connected to said first and second arm members respectively to raise and lower said first and second arm members and said support member.

References Cited by the Examiner

UNITED STATES PATENTS

| | | | |
|---|---|---|---|
| 2,446,136 | 7/1948 | Jarmin | 37—144 |
| 2,725,650 | 12/1955 | Crawford | 37—144 |
| 2,764,824 | 10/1956 | Kepner | 37—144 |
| 2,875,535 | 3/1959 | Williams | 37—144 |
| 2,942,363 | 6/1960 | Ling | 37—144 |
| 3,005,275 | 10/1961 | Febre | 37—144 |

FOREIGN PATENTS 203,104   8/1956   Australia.

ABRAHAM G. STONE, Primary Examiner.

JOE O. BOLT, WILLIAM A. SMITH III, Examiners.